United States Patent

Ejiri et al.

[11] Patent Number: 5,955,189
[45] Date of Patent: Sep. 21, 1999

[54] MAGNETIC RECORDING MEDIUM

[75] Inventors: Kiyomi Ejiri; Koji Naoe, both of Odawara, Japan

[73] Assignee: Fuji Photo Film Co., Ltd., Kanagawa-ken, Japan

[21] Appl. No.: 08/773,512

[22] Filed: Dec. 23, 1996

Related U.S. Application Data

[63] Continuation-in-part of application No. 08/533,864, Sep. 26, 1995, abandoned.

[30] Foreign Application Priority Data

Sep. 30, 1994 [JP] Japan .................................... 6-236570

[51] Int. Cl.⁶ ..................................................... G11B 5/206
[52] U.S. Cl. ........................ 428/323; 428/328; 428/329; 428/330; 428/331; 428/336; 428/694 BA; 428/694 BS; 428/694 BN; 428/900
[58] Field of Search ..................................... 428/323, 328, 428/329, 330, 331, 336, 694 BA, 694 BS, 694 BN, 900

[56] References Cited

U.S. PATENT DOCUMENTS

| | | | |
|---|---|---|---|
| 4,863,793 | 9/1989 | Ogawa et al. | |
| 5,405,679 | 4/1995 | Isobe | 428/212 |
| 5,455,104 | 10/1995 | Sekiguchi et al. | 428/212 |
| 5,458,948 | 10/1995 | Yanagita et al. | 428/141 |
| 5,496,622 | 3/1996 | Isobe et al. | 428/216 |

FOREIGN PATENT DOCUMENTS 2205601  8/1990  Japan .

*Primary Examiner*—Stevan A. Resan
*Attorney, Agent, or Firm*—Sugrue, Mion, Zinn, MacPeak & Seas, PLLC

[57] ABSTRACT

A magnetic recording medium includes at least one magnetic layer formed by dispersing a ferromagnetic powder in a binder, the ferromagnetic powder including at least one kind of rare earth metal element selected from Y or metal elements of lanthanide series and being constituted of acicular ferromagnetic alloy powder particles whose σ s is in the range of 120 to 160 emu/g, whose average longitudinal axis length is in the range of 0.04 to 0.2 μm and whose crystallite size is in the range of 100 to 300 angstroms, the magnetic layer including an abrasive agent whose average particle diameter is in the range of 0.03 to 0.3 μm and containing carbon black having an average particle diameter of 50 to 300 mμ. The magnetic recording medium has an excellent electromagnetic conversion characteristics and, particularly, a good preservation capability and can prevent a magnetic head from being abraded.

19 Claims, No Drawings

MAGNETIC RECORDING MEDIUM

This application is a continuation-in-part of U.S. application Ser. No. 08/533,864 filed Sep. 26, 1995, now abandoned.

BACKGROUND OF THE INVENTION

The present invention relates to a magnetic recording medium and, in particular, to such a medium for high density recording which has an excellent preservation capability.

DESCRIPTION OF THE PRIOR ART

A magnetic recording medium formed by providing a magnetic layer obtained by dispersing terromagnetic iron oxide particles, Co-containing ferromagnetic iron oxide particles, $CrO_2$, ferromagnetic alloy particles or the like in a binder on a non-magnetic support is widely used as a medium for video tapes, audio tapes, magnetic disks and the like.

As disclosed in U.S. Pat. No. 4,863,793, the recent trend is to use shorter recording wavelength for high density recording and, correspondingly, magnetic materials with high σs and Hc and small particle size are being used. Further, thinner magnetic layers are being adopted for reducing self-demagnetization loss and improving resolving power.

In magnetic materials with small particle size and high σs, however, the thickness of the oxidized layer is thin. As a result, when these magnetic materials are used and stored at high temperature, the demagnetization caused by oxidization becomes great. For solving this problem, Japanese Patent Application Laid Open No. 2-205601 proposes to add rare earth metal elements to a magnetic recording medium for improving the weather resistance thereof.

When such magnetic materials are used, the weather resistance of the magnetic recording media can be improved and it has been found that the improvement is more pronounced as the thickness of a magnetic layer is thinner. It can be considered that this is because low frequency signals such as control signals and the like are recorded over the entire thickness of the thin magnetic layer and the reduction in output caused by oxidization demagnetization is great in comparison with a magnetic recording medium having a thicker magnetic layer.

However, while use of magnetic materials to which rare earth metals are added improves the weather resistance of the magnetic recording medium, it also increase the abrasion property of the magnetic materials exceedingly, whereby the magnetic head tends to be abraded.

SUMMARY OF THE INVENTION

It is therefore an object of the present invention to provide a magnetic recording medium which has an excellent electromagnetic conversion characteristics and, particularly, a good preservation capability, and can reduce abrasion of the magnetic head used therewith.

The above and other objects of the present invention can be accomplished by a magnetic recording medium comprising at least one magnetic layer formed by dispersing a ferromagnetic powder in a binder, said ferromagnetic powder including at least one kind of rare earth metal element selected from Y or metal elements of lanthanide series and being constituted of acicular ferromagnetic alloy powder particles whose σs is in the range of 120 to 160 emu/g, whose average longitudinal axis length is in the range of 0.04 to 0.2 $\mu$m and whose crystallite size is in the range of 100 to 300 angstroms, said magnetic layer including an abrasive agent whose average particle diameter is in the range of 0.03 to 0.3 $\mu$m and containing carbon black having an average particle diameter of 50 to 300 m$\mu$.

The ferromagnetic powder to be used in the present invention is preferably a ferromagnetic alloy powder containing 75% or more of Fe, Ni or Co as a main component and includes at least one rare earth metal element selected from Y or metal elements of lanthanide series.

The σs of the ferromagnetic powder particle s to be used in the present invention is in the range of 120 to 160 emu/g and preferably 125 to 160 emu/g. If the σs of the ferromagnetic powder particles is smaller than 120 emu/g, the electromagnetic characteristics, particularly, the reproduced output of the magnetic recording medium is undesirably lowered. On the other hand, if the σs of the ferromagnetic powder particles exceeds 160 emu/g, the dispersibility of the magnetic coating solution is lowered so that it becomes difficult to form a magnetic layer.

The average length of the long axis of the ferromagnetic powder particles to be used in the present invention is in the range of 0.04 to 0.2 $\mu$m, preferably 0.04 to 0.18 $\mu$m and more preferably 0.04 to 0.15 $\mu$m. If the average length of the long axis of the ferromagnetic powder particles is shorter than 0.04 $\mu$m, a sufficiently high coercive force cannot be obtained and, on the other hand, if the average length of the long axis of the ferromagnetic powder particles is longer than 0.2 $\mu$m, a sufficiently high reproduced output cannot be obtained when the recording wavelength is short. Therefore, both cases are undesirable.

The crystallite size of the ferromagnetic powder particles to be used in the present invention is in the range of 100 to 300 angstroms and preferably 100 to 200 angstroms. If the crystallite size of the ferromagnetic powder particles is smaller than 100 angstroms, a sufficiently high σs cannot be obtained and, on the other hand, if the crystallite size of the ferromagnetic powder particles is greater than 300 angstroms, the reproduced output is lowered. Therefore, both cases are undesirable.

Nd, Sm, Dy, Gd, Tb and La are preferably used in the present invention as metal elements of lanthanide series to be contained in the ferromagnetic alloy powder.

In the present invention, the content of Y or rare earth elements to be contained in the ferromagnetic powder is preferably in the range of 0.05 to 14.0 at % and more preferably 0.05 to 5 at % with respect to the main metals.

In the present invention, the ferromagnetic powder may contain Al, Si, S, Sc, Ti, V, Cr, Cu, Mo, Rh, Pd, Ag, Sn, Sb, Te, Ba, Ta, W, Re, Au, Hg, Pb, Bi, La, Ce, Pr, P, Co, Mn, Zn, Ni, Sr, B or the like in addition to predetermined atoms. In particular, it is preferable that the ferromagnetic powder contains Al in an amount of 2 to 15 at % with respect to Fe. These ferromagnetic powders may be treated with a dispersant, lubricant, surfactant, antistatic agent or the like prior to being dispersed.

The ferromagnetic alloy powder in the present invention may contain a small amount of hydroxide or oxide.

As the ferromagnetic alloy powder, that prepared by known processes can be used and, for instance, the ferromagnetic alloy powder prepared by a process disclosed in Japanese Patent Application Laid open No. 2-205601 can be used. The ferromagnetic alloy powder obtained by these methods may be subjected to a known gradual oxidation treatment such as a process which comprises dipping the ferromagnetic alloy powder into an organic solvent with an oxygen-containing gas bubbled thereinto to form an oxide film on the surface of the ferromagnetic alloy powder and then drying the material, and a process which comprises controlling the partial pressure of oxygen gas and inert gas instead of using an organic solvent to form an oxide film on the surface of the ferromagnetic alloy powder. Among these processes, it is preferable to gradually oxidize the ferromagnetic alloy powder in a gas phase without using an organic solvent because this improves the weather resistance.

In the present invention, the specific surface area determined by the BET method is preferably from 40 to 80 m$^2$/g and more preferably from 50 to 70 m$^2$/g. If the specific surface area falls below 40 m$^2$/g, the resulting magnetic recording medium exhibits high noise and if the specific surface area exceeds 80 m$^2$/g, the desired surface properties cannot be obtained.

In the present invention, the ferromagnetic powder preferably exhibits a water content of 0.01 to 2%. The water content of the ferromagnetic powder is preferably optimized in accordance with the binder to be used in combination therewith. The tap density is preferably in the range of 0.3 to 1.5 g/cc or more and more preferably 0.5 to 1.2 g/cc or more.

In the present invention, the pH value of the ferromagnetic powder is preferably optimized in accordance with the binder to be used in combination therewith. The pH value of the ferromagnetic powder is preferably in the range of 4 to 12 and more preferably 6 to 10.

In the present invention, the ferromagnetic powder may contain soluble inorganic ions such as Na, Ca, Fe, Ni, Sr or the like. It is preferable that the total amount of the inorganic ions normally be 500 ppm or less. However, in the case where a non-magnetic layer is provided and the thickness of the magnetic layer is determined to be 1 $\mu$m, the total amount is preferably 200 ppm or less and more preferably 150 ppm or less. If the total amount exceeds 200 ppm, the inorganic ions react with a higher aliphatic acid supplied from the non-magnetic layer as described later to form and precipitate a higher aliphatic acid metal salt which causes spacing loss.

The ferromagnetic powder used in the present invention has as small a void ratio as possible. The void ratio is preferably 20 vol % or less and more preferably 5 vol % or less. In connection with the shape of the ferromagnetic powder particles, an acicular ferromagnetic powder particle satisfying the above mentioned requirements regarding particle size is used and the acicular ratio is preferably 12 or less. It is preferable to reduce the distribution of Hc of the ferromagnetic powder. For this purpose, a process for improving the particle size distribution of geothite, a process for preventing γ-hematite from being sintered or the like can be used. The SFD value of the magnetic recording medium using these ferromagnetic powders is preferably 0.1 to 0.6.

As abrasives to be used in the present invention, known materials having a Mohs' hardness of 6 or more such as α-alumina having an alpha conversion of 90% or more, β-alumina, silicon carbide, chromium oxide, cerium oxide, corundum, artificial diamond, silicon nitride, titanium carbide, titanium oxide, and boron nitride may be used singly or in combination. A composite material made of these abrasives, namely, an abrasive surface-treated with another abrasive may be used. These abrasives may contain compounds or elements other than the main component but exert similar effect provided that the content of the main component is 90% or more. The average particle size of these abrasives must be in the range of 0.03 to 0.3 $\mu$m and is preferably in the range of 0.05 to 0.25 $\mu$m. If the average particle size of the abrasives is less than 0.03 $\mu$m, the abrasive ability is low and the strength of the magnetic coating layer is not sufficiently high, whereby the head clogging or the like tends to be caused. On the other hand, if he average particle size of the abrasives is greater than 0.3 $\mu$m, the abrasive ability is too great, whereby the head tends to be abraded. If the average particle size of these abrasives is within the range of 0.03 to 0.3 $\mu$m, a plurality of abrasives having different particle sizes may, as occasion demands, be used in combination or a single abrasive having a wide particle diameter distribution may be used. The tap density of abrasives to be used in the present invention is preferably in the range of 0.3 to 2 g/cc. The water content of abrasives to be used in the present invention is preferably in the range of 0.1 to 5%. The pH value of abrasives to be used in the present invention is preferably in the range of 2 to 11 and the specific surface area thereof is in the range of 1 to 30 m$^2$/g. The particle size of the abrasives to be used in the present invention may be in the form of an acicular, spherical or die-like shape and preferably have edges on part of the surface thereof to provide a high abrasion ability. Specific examples of abrasives to be used in the present invention include AKP-50 and HIT-50 manufactured by Sumitomo Chemical Co., Ltd., S7 and S-1 manufactured by Nippon Chemical Industrial Co., Ltd., 100ED and 140ED manufactured by Toda Kogyo Co., Ltd. and the like.

In the present invention, the abrasives may be incorporated into the magnetic coating solution in the form of a dispersion in a binder. The number of abrasive particles present on the surface and the end surface of the magnetic layer of the magnetic recording medium is preferably in the range of 5 to 130/100 $\mu$m$^2$ and more preferably in the range of 5 to 90/100 $\mu$m$^2$.

In the present invention, the magnetic recording medium preferably comprises a non-magnetic layer in which a non-magnetic powder is dispersed in a binder and the magnetic layer is preferably provided on the non-magnetic layer.

In the case where only a magnetic layer is provided on a non-magnetic flexible support, since the magnetic layer has to contain antistatic agents and abrasives for improving the antistatic ability and the abrasive ability of the magnetic recording medium, the packing density of the ferromagnetic powder is lowered. However, if a non-magnetic layer in which a non-magnetic powder is dispersed in a binder is provided on a non-magnetic flexible support and a magnetic layer is formed thereon, since the antistatic ability and the abrasive ability of the magnetic recording medium can be improved by causing the non-magnetic layer to contain antistatic agents, abrasives and the like, it is possible to prevent the packing density of the ferromagnetic powder from being lowered.

The non-magnetic powder to be contained in the non-magnetic layer is preferably at least one kind of a non-magnetic powder selected from the group consisting of titanium oxide, barium sulfate, silica, α-alumina, zinc oxide, α-iron oxide, cerium oxide, tin oxide and zirconia.

The particle size of these non-magnetic powders is preferably 0.01 to 2 $\mu$m, but non-magnetic powders having different particle sizes may be used in combination, as occasion demands. For instance, 30 weight parts or less of carbon black may be mixed with the non-magnetic powder per 100 weight parts of the main non-magnetic powder to make it conductive. Further, Cr$_2$O$_3$, diamond, silicon nitride, SiC or the like having a greater particle size may be mixed with the main non-magnetic powder as an abrasive in an amount of 20 weight parts or less. The tap density of the main non-magnetic powder is preferably in the range of 0.05 to 2 g/cc and more preferably 0.2 to 1.5 g/cc. The water content of the main non-magnetic powder is preferably in the range of 0.1 to 5% and more preferably 0.2 to 3%. The pH value of the main non-magnetic powder is preferably in the range of 2 to 11. The specific surface area of the main non-magnetic powder is preferable in the range of 1 to 100 $m^2/g$, more preferably 5 to 50 $m^2/g$ and most preferably 7 to 40 $m^2/g$. The crystallite size of the main non-magnetic powder particles is preferably in the range of 0.01 to 2 $\mu$m. The DBP oil absorption of the main non-magnetic powder is preferably in the range of 5 to 100 ml/100 g, more preferably 10 to 80 ml/100 g and most preferably 20 to 60 ml/100 g. The specific gravity of the main non-magnetic powder is preferably in the range of 1 to 12 and more preferably 2 to 8. The main non-magnetic powder particles may be in any form of an acicular, spherical or die-like shape. The main non-magnetic powder need not necessarily be completely pure but the surface thereof may be treated with other inorganic compounds. In this case, if the purity of the main non-magnetic powder is 70% or more, the technical effects of the present invention are not be reduced. For example, when titanium oxide is used, the surface thereof is generally treated with alumina. The non-magnetic powder preferably exhibits an ignition loss of 20% or less.

Specific examples of the non-magnetic powder to be used in the present invention include UA5600 and UA5605 manufactured by Showa Denko K. K., AKP-20, AKP-30, HIT-50, HIT-100 and ZA-G1 manufactured by Sumitomo Chemical Co., Ltd., TF-100, TF-120 and TF-140 manufactured by Toda Industry Co., Ltd., TTO-51 B, TTO-55A, TTO-55B, TTO-55C, TTO-55S, TTO-55D, FT-1000, FT-2000, FTL-100, FTL-200, M-1, S-1 and SN-100 manufactured by Ishiwara Sangyo Kaisha Ltd., ECT-52, STT-4D, STT-30D, STT-30 and STT-65C manufactured by Titan Kogyo K. K., T-1 manufactured by Mitsubishi Metal Corporation, NS-0, NS-3Y, NS-8Y manufactured by Nippon Shokubai Kagaku Kogyo Co., Ltd., and the like.

The non-magnetic powder to be contained in the non-magnetic layer is preferably surface-treated with an organic substance in order to prevent the non-magnetic powder from adsorbing aliphatic acid to be added and to increase the amount of binder resin adsorbed onto the non-magnetic powder particles.

Specific examples of the organic substance to be used for surface-treatment include an organic acid having a pKa value of 3 or less, an epoxy-group-containing compound, a silane coupling agent, a titanate coupling agent and the like. Concrete compounds and treating methods are disclosed in Japanese Patent Application Laid Open No. 5-182178.

In the present invention, in the case where carbon black is used together with the main non-magnetic powder, the carbon black can be furnace black for rubber, thermal black for rubber, black for color, acetylene black or the like. Such carbon black has a specific surface area of 100 to 500 $m^2/g$, preferably 150 to 400 $m^2/g$, and a DPB oil absorption of 20 to 400 ml/100 g, preferably 30 to 200 ml/100 g. The particle diameter of the carbon black is in the range of 5 to 80 m$\mu$, preferably 10 to 50 m$\mu$ and more preferably 10 to 40 m$\mu$. Preferably, the pH value of the carbon black is in the range of 2 to 10, the water content thereof is in the range of 0.1 to 10% and the tap density thereof is in the range of 0.1 to 1 g/cc. Specific examples of carbon black to be used together with the main non-magnetic powder in the present invention include BLACKPEARLS 2000,1300, 1000, 900, 800, 880, 700, VULKAN and XC-72 manufactured by Cabot Co., Ltd., #3250B, #950B, #650B, #970B and #850B manufactured by Mitsubishi Chemical Industries Ltd., CONDUCTEX SC manufactured by Columbia Carbon Co., Ltd. and 8800, 8000, 7000, 5750, 5250, 3500, 2100, 2000,1800,1500, 1255 and 1250 manufactured by RAVEN Co., Ltd., Ketjen Black EC manufactured by Agzo Co., Ltd. and the like. It is possible to use carbon blacks surface-treated with a dispersant or grafted with a resin or partially graphitized carbon blacks. These carbon blacks may be previously dispersed in a binder before being added to the non-magnetic coating solution. These carbon blacks may be used singly or in combination with other kinds of carbon blacks. Carbon black is preferably used in an amount of 0.1 to 30% by weight per 100% by weight of the main non-magnetic powder. Carbon black serves to inhibit the electrification of the non-magnetic layer, to provide a light screening effect to the magnetic recording medium and to enhance the film strength and the like. These functions depend on the kind of carbon black used. Therefore, in this invention, if one or more carbon blacks are used, it is preferable to select the kind, amount and combination of carbon blacks and to adjust the particle size, oil absorption, pH value and the like within the above described range in accordance with the purpose.

As regards carbon blacks which can be used in the present invention, reference can be made to, for example, "Handbook of Carbon Blacks," Carbon Black Kyokai.

In the present invention, the magnetic layer contains carbon black whose average particle diameter is in the range of 50 to 300 m$\mu$. If the average particle diameter of the carbon black is smaller than 50 m$\mu$, the friction coefficient of the magnetic layer tends to increase. On the other hand, if the average particle diameter of the carbon black is greater than 300 m$\mu$, the surface properties of the magnetic layer tend to deteriorate, thereby lowering the electromagnetic conversion characteristics and increasing spacing loss.

Specific examples of carbon blacks to be used in the present invention include furnace black for rubber, thermal black for rubber, black for color, acetylene black and the like. The average primary particle size of the carbon black is preferably in the range of 50 to 300 m$\mu$, more preferably in the range of 70 to 280 m$\mu$. The specific surface area of the carbon black is preferably 5 to 500 $m^2/g$, and its DPB oil absorption is preferably in the range of 10 to 400 ml/100 g. Preferably, the pH value of the carbon black is in the range of 2 to 10, the water content thereof is in the range of 0.1 to 10% and the tap density thereof is in the range of 0.1 to 1 g/cc. It is possible to use carbon blacks surface-treated with a dispersant or grafted with a resin or partially graphitized carbon blacks.

These carbon blacks may be dispersed in a binder before being added to the magnetic coating solution. These carbon blacks may be used singly or in combination with other kinds of carbon blacks. Carbon black is preferably used in an amount of 0.1 to 30% by weight per 100% by weight of the magnetic powder. The carbon black to be contained in the magnetic layer is intended to reduce the friction coefficient of the magnetic layer, but it is possible to together use the carbon black which serves to provide a light screening effect to the magnetic recording medium and to enhance the film strength and the like. Further, carbon blacks having particle diameter smaller than that mentioned above may used together in accordance with the purpose.

As regards carbon blacks which can be used in the present invention, reference can be made to, for example, "Handbook of Carbon Blacks," Carbon Black Kyokai.

Binders to be incorporated in the magnetic layer and the non-magnetic layer according to the present invention include known thermoplastic resins, thermosetting resins reactive resins and the mixtures thereof.

Thermoplastic resins to be used in the present invention include those having a glass transition temperature of −100 to 150° C., a number-average molecular weight of 1,000 to 200,000, preferably 10,000 to 100,000 and a polymerization degree of about 50 to 1,000.

Examples of such thermoplastic resins include polymers or copolymers containing as constituent units vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal, vinyl ether or the like, polyurethane resins and various rubber resins.

Examples of the thermosetting resins or reactive resins include phenol resin, epoxy resin, polyurethane hardening resin, urea resin, melamine resin, alkyd resin, acrylic reactive resin, formaldehyde resin, silicone resin, epoxy-polyamide resin, a mixture of polyester resin and isocyanate prepolymer, a mixture of polyester polyol and polyisocyanate, and a mixture of polyurethane and polyisocyanate and the like.

These resins are described in detail in "Plastic Handbook," Asakura Shoten. Further, known electron radiation curing resins can be incorporated into either the non-magnetic layer or the magnetic layer. Examples of these resins and their preparation methods are described in detail in Japanese Patent Application Laid Open No. 62-256219.

These resins can be used singly or in combination. Preferred examples of resin combinations include a combination of at least one resin selected from the group consisting of vinyl chloride resin, vinyl chloride-vinyl acetate resin, vinyl chloride-vinyl acetate-vinyl alcohol resin, vinyl chloride-vinyl acetate-maleic anhydride copolymer with a polyurethane resin, and a combination thereof with polyisocyanate.

Examples of the structure of polyurethane resins include known structures such as polyester polyurethane, polyether polyurethane, polyether polyester polyurethane, polycarbonate polyurethane, polyester poly carbonate polyurethane and polycaprolactone polyurethane and the like.

Among these binders, those in which at least one polar group selected from $COOM$, $SO_3M$, $OSO_3M$, $P=O$, $(OM)_2$, $OH$, $NR_2$, $N^+R_3$ (in which R represents a hydrocarbon group), epoxy group, SH, CN and the like has been introduced by copolymerization or addition reaction may be optionally used to obtain better dispersibility and durability. The amount of such a polar group is in the range of about $10^{-1}$ to $10^{-8}$ mole/g, preferably $10^{-2}$ to $10^{-6}$.

Specific examples of these binders to be used in the present invention include VAGH, VYHH, VMCH, VAG F, VAGD, VROH, VYES, VYNC, VMCC, XYHL, XYSG, PKHH, PKHJ, PKHC and PKFE manufactured by Union Carbide Co., Ltd.; MPR-TA, MPR-TA5, MPR-TAL, MPR-TSN, MPR-TMF, MPR-TS and MPR-TM manufactured by Nisshin Chemical Industry Co., Ltd.; 1000W, DX80, DX81, DX82 and DX83 manufactured by Electro Chemical Industrial Co., Ltd.; MR110, MR100 and 400X110A manufactured by Nippon Zeon Co., Ltd.; Nippolan N2301, N2302 and N2304 manufactured by Nippon Polyurethane Co., Ltd.; Pandex T-5105, T-R3080 and T-5201, Barnock D-400 and D-210-80, and Crisvon 6109 and 7209 manufactured by Dai nippon Ink and Chemicals Inc.; Vylon UR8200, UR8300, RV530, RV280, UR8600 and UR5500 manufactured by Toyobo Co., Ltd.; Daipheramine 4020, 5020, 5100, 5300, 9020, 9022 and 7020 manufactured by Dainichi Seika Co., Ltd.; MX5004 manufactured by Mitsubishi Chemical Industries Ltd.; Sunprene SP-150 manufactured by Sanyo Chemical Industries Co., Ltd.; and Salan F310 and F210 manufactured by Asahi Chemical Industry Co., Ltd. and the like.

In the present invention, the content of the binders in the magnetic layer and the non-magnetic layer is preferably in the range of 5 to 50% by weight and more preferably 10 to 30% by weight based on the total weight of the ferromagnetic powder contained in the magnetic layer and the non-magnetic powder contained in the non-magnetic layer. If a vinyl chloride resin is to be used, its content is preferably in the range of 5 to 30% by weight. If a polyurethane resin is to be used, its content is preferably in the range of 2 to 20% by weight. If a polyisocyanate resin is to be used, its content is preferably in the range of 2 to 20% by weight. These binder resins are preferably used in these amounts in combination.

If a polyurethane resin is to be used as a binder in the present invention, its glass transition temperature, breaking extension, breaking stress and yield point are preferably in the ranges of −50 to 100 ° C., 100 to 2,000%, 0.05 to 10 $Kg/cm^2$ and 0.05 to 10 $Kg/cm^2$.

If a non-magnetic layer is provided in the present invention, the amount of the binder, the amount of vinyl chloride resin, polyurethane resin, polyisocyanate or other resins to be contained in the binder, the molecular weight of resins constituting the magnetic layer, the amount of polar group, the physical properties of the above mentioned resins can be altered between the non-magnetic layer and the magnetic layer as is necessary.

Examples of isocyanates which can be used in the present invention include isocyanates such as tolylenediisocyanate, 4-4'-diphenylmethane diisocyanate, hexmethylene diisocyanate, xylene diisocyanate, naphthylene-1,5-diisocyanate, o-toluidine diisocyanate, isophorone diisocyanate, triphenylmethane triisocyanate and like, products of the reaction of these isocyanates with polyalcohols, and polyisocyanates produced by the condensation of isocyanates. Specific examples of these isocyanates include Coronate L, Coronate-HL, Coronate-2030, Coronate-2031, Millionate-MR and Millionate-MTL manufactured by Nippon Polyurethane Co., Ltd.; Takenate D-102, Takenate D-110N, Takenate D-200 and Takenate D-202 manufactured byTakeda Chemical Industries, Co., Ltd.; Desmodur L, Desmodur IL, Desmodur N and Desmodur HL manufactured by Sumitomo Bayer Co., Ltd. and the like. These isocyanates may be used singly. Alternatively, by making the best use of the difference in their hardening reactivity, two or more of these isocyanates may be used in combination in both the magnetic layer and the non-magnetic layer.

In the present invention, the magnetic layer or the non-magnetic layer preferably contains higher aliphatic acid for improving the running durability. The higher aliphatic acid to be contained in the magnetic layer or the non-magnetic layer is mainly monobasic aliphatic acid with 10 to 26 carbon atoms and may be saturated or unsaturated. Further, it may be linear or branched. A carbon to which a carboxyl group is bonded may be any one of a primary, secondary and tertiary carbon. Specific examples of these higher aliphatic acids include lauric acid, palmitic acid, myristic acid, stearic acid, behenic acid, oleic acid, linolenic acid, elaidic acid and the like. The amount of higher aliphatic acid to be contained in the non-magnetic layer is 0.1 to 20% by weight, preferably 0.1 to 10% by weight and more preferably 0.1 to 5% by weight on the basis of the non-magnetic powder (which is all non-magnetic powder, if two or more kinds of the non-magnetic powder are used). The amount of higher aliphatic acid to be contained in the magnetic layer is 0.1 to 20% by weight, preferably 0.1 to 10% by weight and more preferably 0.1 to 5% by weight on the basis of the ferromagnetic powder.

Further, in the present invention, additives such as a dispersant, lubricant, antistatic agent, surface active agent, plasticizer and the like may be used in accordance with the purpose. The additives to be used in the present invention can be those having a lubricating effect, an antistatic effect, a dispersing effect, a plasticizing effect and so on. For example, molybdenum disulfide, tungsten disulfide, graphite, boron nitride, fluorinated graphite, silicone oil, silicone having a polar group, aliphatic acid-modified silicone, fluorine-containing silicone, fluorine-containing alcohol, fluoride-containing ester, polyolefin, polyglycol, ester alkylphosphate and alkaline metal salt thereof, ester, ester alkylsulfate and alkaline metal salt thereof, polyphenyl ether, fluorine-containing ester alkylsulfate and alkaline metal salt thereof, monovalent, divalent, trivalent, tetravalent, pentavalent and hexavalent alcohol with 12 to 22 carbon atoms (which may contain an unsaturated bond or may be branched), alkoxy alcohol with 12 to 22 carbon atoms, monoaliphatic acid ester, dialiphatic acid ester or trialiphatic acid ester consisting of a higher aliphatic acid with 12 to 22 carbon atoms (which may contain an unsaturated bond or may be branched) and one of monovalent, divalent, trivalent, tetravalent, pentavalent and hexavalent alcohol with 2 to 12 carbon atoms (which may contain an unsaturated bond or may be branched), aliphatic ester of monoalkyl ether of alkylene oxide polymer, aliphatic amide with 8 to 22 carbon atoms, aliphatic amine with 8 to 22 carbon atoms, aliphatic acid ester (which may contain an unsaturated bond or may be branched) consisting of aliphatic acid with 10 to 24 carbon atoms and alcohol and the like can be used. Specific examples of such additives include stearic acid amide, myristic acid amide, butyl stearate, oleyl oleate, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol and lauryl alcohol. Further, non-ionic surface active agents such as alkylene oxide, glycerin, glycidol and alkylphenolethylene oxide addition product and the like; cationic surface active agents such as cyclic amine, ester amide, quaternary ammonium salt, hydantoin derivative, heterocyclic compound, phosphonium and sulfonium and the like; anionic surface active agents containing polar groups such as carboxylic acid, sulfonic acid, phosphoric acid, ester sulfate, ester phosphate and the like; amphoteric surface active agents such as amino acid, aminosulfonic acid, sulfuric or phosphoric ester of amino alcohol, alkylbetaine and the like, can be used. These surface active agents are described in detail in "Kaimen Kasseizai Binran (Handbook of Surface Active Agents)," Sangyo Tosho K. K. These additives, including dispersants, lubricants, antistatic agents, surface active agents, plasticizers and the like, need not necessarily be 100% pure, but may contain impurities such as isomer, unreacted material, by-product, decomposition product, oxide and the like. The concentration of these impurities is preferably 30% by weight or less, more preferably 10% by weight or less.

Additives such as dispersants, lubricants, antistatic agents, surface active agents, plasticizers and the like to be used in the present invention may be varied in their kind and content between the non-magnetic layer and the magnetic layer as is necessary. For example, aliphatic acids may be varied in their melting points between the non-magnetic layer and the magnetic layer to control the oozing thereof to the surface and esters may be varied in their boiling points or polarity between the non-magnetic layer and the magnetic layer to control the oozing thereof to the surface. Further, the content of surface active agents may be controlled to improve the coating stability and the content of lubricants may be higher in the intermediate layer to improve the lubricating effect. It goes without saying that additives such as dispersants, lubricants, antistatic agents, surface active agents, plasticizers and the like can be varied in their kind and content between the non-magnetic layer and the magnetic layer in different ways from the above for other purposes.

The additives to be used in the present invention may be entirely or partially added to the system at any step during the preparation of the magnetic coating solution. For example, these additives may be mixed with the ferromagnetic powder before kneading. Further, these additives may be added to the system at the step of kneading ferromagnetic powder with a binder and a solvent. Alternatively, these additives may be added to the system during or after the dispersion step or immediately before the coating step. Specific examples of lubricants to be used in the present invention include NAA-102, NM-415, NM-312, NM-160, NAA-180, NAA-174, NAA-175, NAA-222, NAA-34, NAA-35, NAA-171, NAA-122, NAA-142, NAA-160, NAA-173K, castor oil hardened aliphthatic acid, NM-42, NM-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion 0-2, Nonion LP-20R, Nonion PP-40R, Nonion SP-60R, Nonion OP-80R, Nonion OP-85R, Nonion LT-221, Nonion OT-221, Monogly MB, Nonion DS-60, Anon BF, Anon LG, butyl stearate, butyl laurate, and erucic acid manufactured by Nippon Oils and Fats Co., Ltd.; oleic acid manufactured by Kanto Chemicals Co., Ltd.; FAL-205 and FAL-123 manufactured by Takemoto Yushi Co., Ltd.; Enujerubu LO, Enujerubu IPM and Sansosyzer E4030 manufactured by Shin Nihon Rika Co., Ltd.; TA-3, KF-96, KF-96L, KF-96H, KF-410, KF-420, KF-965, KF-54, KF-50, KF-56, KF-907, KF-851, X-22-819, X-22-822, KF-905, KF-700, KF-393, KF-857, KF-860, KF-865, X-22-980, KF-101, KF-102, KF-103, X-22-3710, X-22-3715, KF-910, and KF-3935 manufactured by The Shin-Etsu Chemical Co., Ltd.; Armide P, Armide C and Armoslip CP manufactured by Lion Armor Co., Ltd.; Duomine TDO manufactured by Lion Fat and Oil Co., Ltd.; BA-41G manufactured by The Nisshin Oil Mills Co., Ltd.; Profan 2012E, Newpole PE61, Ionet MS-400, Ionet MO-200, Ionet DL-200, Ionet DS-300, Ionet DS-1000, and Ionet DO-200 manufactured by Sanyo Chemical Co., Ltd. and the like.

Examples of organic solvents to be used in the present invention include ketones such as acetone, methyl ethyl ketone, methyl isobutyl ketone, diisobutyl ketone, cyclohexanone, isophorone, tetrahydrofuran and the like; alcohols such as methanol, ethanol, propanol, butanol, isobutyl alcohol, isopropyl alcohol, methyl cyclohexanol and the like; esters such as methyl acetate, butyl acetate, isobutyl acetate, isopropyl acetate, ethyl butyrate, glycol acetate and the like; glycol ethers such as glycol dimethyl ether, glycol monoethyl ether, dioxane and the like; aromatic hydrocarbons such as benzene, toluene, xylene, cresol, chlorobenzene and the like; chlorinated hydrocarbons such as methylene chloride, ethylene chloride, carbon tetrachloride, chloroform, ethylene chloro-hydrin, dichlorobenzene and the like; N,N-dimethylformamine; hexane and the like. These organic solvents may be used in any proportion. These organic solvents need not necessarily be 100% pure and may contain impurities such as isomers, unreacted materials, by-products, decomposition products, oxides, water content and the like besides the main components. The content of these impurities is preferably 30% by weight or less and more preferably 10% by weight or less. Organic solvents to be used in the present invention may be varied in their kind and content between the magnetic layer and the non-magnetic layer as is necessary. For example, a solvent having a high volatility may be used for the magnetic layer to improve the surface properties while a solvent having a high surface tension may be used for the non-magnetic layer to enhance the coating stability. Further, a solvent having a high solubility parameter may be used for the magnetic layer to improve the packing ability. These are merely examples and the present invention is not limited to these examples.

The thickness of a non-magnetic flexible support for the magnetic recording medium according to the present invention is preferably in the range of 1 to 100 μm and more preferably 6 to 20 μm. The thickness of the non-magnetic layer is preferably in the range of 0.5 to 10 μm and more preferably 1 to 5 μm. The thickness of the magnetic layer is preferably in the range of 0.1 to 4.0 μm and preferably 0.1 to 1.0 μm. If the non-magnetic layer is provided, it is most preferable for the thickness of the magnetic layer to be in the range of 0.1 to 0.8 μm. The total thickness of the magnetic layer and the non-magnetic layer is preferably in the range of 1/100 to two times the thickness of the non-magnetic flexible support. An undercoating layer may be provided between the non-magnetic flexible support and the non-magnetic layer to enhance the adhesion therebetween. The thickness of the undercoating layer is in the range of 0.01 to 2 μm and preferably 0.05 to 0.5 μm. A back coating layer may be provided on the non-magnetic flexible support on the opposite side from the magnetic layer. The thickness of the back coating layer is in the range of 0.1 to 2 μm and preferably 0.3 to 1.0 μm. The undercoating layer and the back coating layer can be formed of known materials.

The non-magnetic flexible support to be used in the present invention can be any known film such as polyester, e.g., polyethylene terephthalate, polyethylene naphthalate and the like; polyolefin; cellulose triacetate; polycarbonate; polyamide; polyimide; polyamide polyamide; polysulfon, aramide, aromatic polyamide and the like. Such a support may be previously subjected to corona discharge, plasma treatment, easy adhesion treatment, heat treatment, dust removing treatment and the like. In order to accomplish the object of the present invention, it is preferable to use a non-magnetic flexible support having a center-line average surface roughness of 0.001 to 0.03 μm, more preferably 0.001 to 0.02 μm and most preferably 0.001 to 0.01 μm. Such a non-magnetic support preferably not only has a small average surface roughness on the center line, but also no big protrusions measuring 1 μm or more. The surface roughness may be freely controlled by the particle size and amount of filler to be incorporated into the support as is necessary. Examples of the filler include oxide and carbonate of Ca, Si, Ti and the like, and finely divided powder of organic material such as acryl. The non-magnetic flexible support to be used in the present invention preferably exhibits F-5 (namely, the load at 5% elongation) values of 5 to 50 Kg/mm$^2$ in the tape running direction and 3 to 30 Kg/mm$^2$ in the tape width direction. In general, the F-5 value in the tape longitudinal direction is higher than the F-5 value in tape width direction. However, if the strength in the width direction needs to be high, the present invention is not limited to this general rule.

The non-magnetic flexible support to be used in the present invention preferably exhibits a tape running direction and width direction heat shrinkage of 3% or less, more preferably 1.5% or less at 100° C. for 30 minutes and 1% or less, more preferably 0.5% or less at 80° C. for 30 minutes. The breaking strength of the non-magnetic flexible support is preferably in the range of 5 to 100 Kg/mm$^2$ in both directions. The elastic modulus thereof is preferably in the range 100 to 2,000 Kg/mm$^2$ in both directions.

The process for preparing the magnetic solution for constituting the magnetic layer of the magnetic recording medium according to the present invention comprises at least a kneading step, a dispersion step, and a mixing step which is optionally effected before or after these steps. Each of these steps may consist of two or more stages. The raw materials to be used in the present invention such as ferromagnetic powders, binders, carbon blacks, abrasives, antistatic agents, lubricants, solvents and the like may be added to the system at the beginning of or during any step. Each of these raw materials may be added to the system at two or more steps. For example, polyurethane may be charged into the system at the kneading step, dispersing step and mixing step for viscosity adjustment after dispersion.

In the present invention, known manufacturing techniques can be used for manufacturing the magnetic recording medium. As a kneading apparatus, an open kneader, a continuous kneader, a pressure kneader or the like can be used. During kneading, the ferromagnetic powders or non-magnetic powders are kneaded with the whole or part of the binder (preferably 30% by weight or more of the total weight of all binders) in an amount of 15 to 500 parts by weight based on 100 parts by weight of ferromagnetic powders or non-magnetic powders. These kneading treatments are described in detail in U.S. Pat. Nos. 4,946,615 and 5,300,244.

In the present invention, a gravure coating method, roll coating method, blade coating method, extrusion coating method or the like that is normally used for applying a magnetic coating solution can be used for providing the magnetic layer on the non-magnetic flexible support.

In the present invention, examples of methods for providing the non-magnetic layer and the magnetic layer on the non-magnetic flexible support include a method for applying the magnetic layer by means of a support pressure type extrusion coating apparatus as disclosed in U.S. Pat. Nos. 4,480,583, 4,681,062 and 5,302,206 after applying the non-magnetic layer by means of a gravure coating apparatus, roll coating apparatus, blade coating apparatus, extrusion coating apparatus or the like that is normally used for applying a magnetic coating solution and drying it, a method for applying the magnetic layer by means of a support pressure type extrusion coating apparatus as disclosed in Japanese Patent Publication No. 1-46186, Japanese Patent Application Laid Open Nos. 60-238179 and 2-265672 after applying the non-magnetic layer by means of a gravure coating apparatus, roll coating apparatus, blade coating apparatus, extrusion coating apparatus or the like and while the non-magnetic is still wet, a method for applying the magnetic layer and the non-magnetic layer almost simultaneously by means of a single coating head having two slits for coating solutions as disclosed in U.S. Patent Nos. 4,854,262, 5,072, 688 and 5,302,206, a method for applying the magnetic layer and the non-magnetic layer almost simultaneously by means of an extrusion coating apparatus with a backup roller as disclosed in Japanese Patent Application Laid Open No. 2-174965 or the like. Among these methods, it is preferable to employ the method for providing the magnetic layer on the non-magnetic layer while the latter is still wet and is more preferable to employ the method for almost simultaneously providing the non-magnetic layer and the magnetic layer on the non-magnetic flexible support.

In the present invention, two or more magnetic layers can provided in a similar manner.

The magnetic layer is subjected to a strong orientation for manufacturing the magnetic recording medium according to the present invention. A solenoid having the magnetic flux density of 1,000 G (Gauss) or more and a cobalt magnet having the magnetic flux density of 2,000 G or more are preferably used in combination for orientation. Further, it is preferable for the magnetic layer to be properly dried prior to the orientation to maximize the orientability after drying. If the present invention is applied to a disc medium, an orientation method for randomizing orientation is needed instead.

In the present invention, as a calendering roller for orientation, there can be used a roller made of heat-resistant plastic such as epoxy, polyimide, polyamide, polyimideamide or the like. Alternatively only metallic rollers can be used in combination for orientation. The calender processing temperature is preferably in the range of 70 to 150° C., more preferably 80 to 150° C. The linear pressure is preferably in the range of 200 to 500 Kg/cm, more preferably 300 to 400 Kg/cm.

The magnetic recording medium of the present invention preferably exhibits a frictional coefficient of 0.5 or less, more preferably 0.3 or less, with respect to SUS420J on the surface of the magnetic layer and the opposite surface thereto. The magnetic layer preferably has an inherent surface resistivity of $10^{-5}$ to $10^{-12}$ Ω/sq. The magnetic layer preferably exhibits an elasticity of 100 to 2,000 Kg/mm at 5% elongation in both its web running direction and its width direction and the breaking strength thereof is preferably in the range of 1 to 30 Kg/cm$^2$. The elasticity of the magnetic recording medium is preferably in the range of 100 to 1,500 Kg/mm$^2$ in both the web running direction and the width direction and the residual elongation thereof is preferably in the range of 0.5% or less. The heat shrinkage of the magnetic recording medium at all temperatures at and below 100° C. is preferably 1% or less, more preferably 0.5% or less and most preferably 0.1% or less.

In the present invention, the elasticity of the magnetic layer is preferably in the range of 100 to 2,000 Kg/mm$^2$ in the longitudinal direction and the width direction, and that of the non-magnetic layer is preferably in the range of 100 to 2,000 Kg/mm$^2$ in the longitudinal direction and the width direction. However, the elasticity of the magnetic layer and the non-magnetic layer may be varied in accordance with the purposes.

In the present invention, the amount of residual solvents contained in the magnetic layer and the non-magnetic layer is preferably in the range of 100 mg/m$^2$ or less, more preferably 10 mg/M$^2$ or less.

In the present invention, the magnetic layer and the non-magnetic layer preferably has voids at 30% by volume or less, more preferably 10% by volume or less.

Among the magnetic characteristics of the magnetic recording medium of the present invention, the squareness ratio measured under a magnetic field of 5 KOe is preferably in the range of 0.70 or more, more preferably 0.80 or more and most preferably 0.90 or more in the tape running direction. The squareness ratio in the two directions perpendicular to the tape running direction is preferably in the range of 80% or less of that in the tape running direction. SFD of the magnetic layer is preferably in the range of 0.6 or less.

In the present invention, in the case where the magnetic recording medium comprises two or more layers, namely, where it comprises one non-magnetic layer and one magnetic layer, one non-magnetic layer and two or more magnetic layers, two or more non-magnetic layers and one magnetic layer, or two or more non-magnetic layers and two or more magnetic layers, it will readily be understood that the physical properties of the individual layer may be different. For example, the elasticity of the non-magnetic layer can be increased to improve the running durability, while the elasticity of the magnetic layer can be made lower than that of the non-magnetic layer to improve the contact of the magnetic recording medium with the head.

Examples will now be described to clarify the effects of the present invention. In the examples, "part" indicates "part by weight."

EXAMPLE 1

Components of a coating solution each having the composition set out below were kneaded by a continuous kneader and were then dispersed by means of a sand mill. One part of polyisocyanate was added to the resultant dispersion and 40 parts of butyl acetate were added to the mixture. Then, the resultant mixture was filtered by a filter having an average pore diameter of 1 μm, thereby preparing a coating solution for a non-magnetic layer.

Non-magnetic powder TiO$_2$ 80 parts
    Crystalline system: rutile
    Average primary particle diameter: 0.035 μm
    Specific surface area by BET method: 40 m$^2$/g
    pH: 7.0
    TiO$_2$ content: 90% by weight or more
    DBP oil adsorption: 27 to 38 ml/100 g
    Surface treating agent: Al$_2$O$_3$
Carbon black 10 parts
    Average primary particle diameter: 16 mμ
    DBP oil adsorption: 80 ml/100 g
    pH: 8.0
    Specific surface area by BET method: 250 m$^2$/g
    Volatile content: 1.5%
Vinylchloride resin 12 parts
(containing —SO$_3$Na group and epoxy group; MR-10 manufactured by Nippon Zeon Co., Ltd.)
Polyester polyurethane resin 5 parts
(neopentyl glycol/caprolactone/MDI=0.9/2.6/1; containing —SO$_3$Na group in an amount of $1\times10^{-4}$ eq/g)
Polyisocyanate 3 parts
(Colonate-L manufactured by Nippon Polyurethane Co., Ltd.)
Butyl stearate 1 part
Stearic acid 2 parts
Methyl ethyl ketone 150 parts
Cyclohexane 50 parts Further, components of a coating solution each having the composition set out below were kneaded by a continuous kneader and were then dispersed by means of a sand mill. 3 parts of polyisocyanate were added to the resultant dispersion and 40 parts of butyl acetate were added to the mixture. Then, the resultant mixture was filtered by a filter having an average pore diameter of 1 μm, thereby preparing a coating solution for a magnetic layer.
Ferromagnetic alloy powder 100 parts
(composition: Fe/Co=90/10)
  Y content: 2.0 at %/Fe
  Al content: 10.0 at %/Fe
  Hc: 1800 Oe
  Specific surface area by BET method: 58 m$^2$/g
  Crystallite size: 175 angstroms
  Average length of the long axis: 0.1 μm
  Acicular ratio: 7
  σs: 130 emu/g
  Water soluble Na: 10 ppm
  Water soluble Ca: 10 ppm
  Water soluble Fe: 0 ppm
Vinylchloride resin 12 parts
(containing —SO$_3$Na group in an amount of 1×10$^{-4}$ eq/g; polymerization degree: 300; MR-110 manufactured by Nippon Zeon Co., Ltd.)
Polyester polyurethane resin 3 parts
(neopentyl glycol/caprolactone/MDI=0.9/2.6/1; containing —SO$_3$Na group in an amount of 1×10$^{-4}$ eq/g)
Polyisocyanate 3 parts
(Colonate-L manufactured by Nippon Polyurethane Co., Ltd.)
α-alumina 2 parts
(average particle diameter: 0.22 μm)
Carbon black 0.5 parts
(average particle diameter: 80 mμ)
Butyl stearate 1 part
Stearic acid 2 parts
Methyl ethyl ketone 150 parts
Cyclohexane 50 parts The thus prepared coating solution for the non-magnetic layer and coating solution for the magnetic layer were simultaneously coated on a 7 μm thick polyethylene terephthalate support having a center-line average surface roughness of 0.01 μm by means of a die coater having two slits so that a magnetic layer was formed on a non-magnetic layer. The dry thickness of the non-magnetic layer was 2 μm and the dry thickness of the magnetic layer was 0.2 μm. While the two layers were still wet, the material was oriented under a cobalt magnet having a magnetic force of 3,000 Oe and a solenoid having a magnetic force of 1,500 Oe. After being dried, the material was calendar-treated through a 7-stage calender made of only metal rollers at a temperature of 90° C. The material was then slit into 8-mm wide strips to prepare an 8-mm video tape.

EXAMPLE 2

An 8-mm video tape was prepared in the same manner as in Example 1 except that the coating solution for the magnetic layer was prepared using α-alumina having an average particle diameter of 0.28 μm and carbon black having an average particle diameter of 55 mμ.

EXAMPLE 3

An 8-mm video tape was prepared in the same manner as in Example 1 except that the coating solution for the magnetic layer was prepared using ferromagnetic alloy powder particles whose average length of the long axis was 0.15 μm, σs was 128 emu/g, and crystallite size was 190 angstroms, and which contained Nd instead of Y in an amount of 3.5 at % based on Fe, and using carbon black having an average particle diameter of 95 mμ, and that the magnetic layer was formed so that the dry thickness thereof was 0.5 μm.

EXAMPLE 4

An 8-mm video tape was prepared in the same manner as in Example 1 except that the coating solution for the magnetic layer was prepared using ferromagnetic alloy powder particles whose average length of the long axis was 0.13 μm, σs was 127 emu/g and crystallite size was 180 angstroms, and which contained Sm instead of Y in an amount of 3.5 at % based on Fe, and using carbon black having an average particle diameter of 95 mμ, and that the magnetic layer was formed so that the dry thickness thereof was 0.4 μm.

EXAMPLE 5

An 8-mm video tape was prepared in the same manner as in Example 1 except that the coating solution for the magnetic layer was prepared using ferromagnetic alloy powder particles whose average length of the long axis was 0.15 μm, σs was 132 emu/g and crystallite size was 185 angstroms, and which contained Tb instead of Y in an amount of 2.5 at % based on Fe, and using carbon black having an average particle diameter of 80 mμ, and that the following non-magnetic powder was used instead of TiO$_2$.
Non-magnetic powder: barium sulfate
  Average primary particle diameter: 0.050 μm
  Specific surface area by BET method: 45 m$^2$/g
  pH: 8.5
  Barium sulfate content: 9O% by weight or more

EXAMPLE 6

An 8-mm video tape was prepared in the same manner as in Example 1 except that the coating solution for the magnetic layer was prepared using ferromagnetic alloy powder particles whose average length of the long axis was 0.11 μm and crystallite size was 180 angstroms, and which contained La instead of Y in an amount of 2.5 at % based on Fe, and using carbon black having an average particle diameter of 80 mμ, and that the following non-magnetic powder was used instead of TiO$_2$.
Non-magnetic powder: α-alumina
  Average primary particle diameter: 0.050 μm
  Specific surface area by BET method: 35 m$^2$/g
  pH: 9.0
  α-alumina content: 90% by weight or more
  Surface treating agent: phenylphosphonic acid

EXAMPLE 7

An 8-mm video tape was prepared in the same manner as in Example 1 except that the coating solution for the magnetic layer was prepared using ferromagnetic alloy powder particles whose average length of the long axis was 0.11 μm and crystallite size was 180 angstroms, and which contained La instead of Y in an amount of 2.5 at % based on Fe, and using carbon black having an average particle diameter of 80 mμ, and that the following non-magnetic powder was used instead of TiO$_2$.

Non-magnetic powder: α-iron oxide
  Average primary particle diameter: 0.018 μm
  Specific surface area by BET method: 55 m²/g
  pH: 6.7
  α-iron oxide content: 85% by weight or more

COMPARATIVE EXAMPLE 1

An 8-mm video tape was prepared in the same manner as in Example 1 except that the coating solution for the magnetic layer was prepared using ferromagnetic alloy powder particles whose σs was 118 emu/g, α-alumina having an average particle diameter of 0.4 μm, and carbon black having an average particle diameter of 16 mμ.

COMPARATIVE EXAMPLE 2

An 8-mm video tape was prepared in the same manner as in Comparative Example 1 except that Y was not added.

The thus obtained 8-mm video tape samples by Examples 1 to 7 and Comparative Examples 1 and 2 were evaluated by the following methods.

Loss of magnetization (Demagnetization):
  The loss of magnetization was measured at an Hm of 5 kOe using a sample-vibrating magnetoflux meter (manufactured by Toei Kogyo Co., Ltd.).

Length of acicular magnetic particle:
  The average particle diameter in the long axis was measured using a transmission-type electron microscope.

Crystallite size:
  The crystallite size was determined from the half width at the peak obtained by X-ray diffraction on the (4, 4, 0) plane and the (2, 2, 0) plane.

Evaluation of running durability:
  Using ten 8-mm video decks ("FUJIX8" manufactured by Fuji Photo Film Co., Ltd.), P6-120 tapes were run over 100 passes at 23° C. and 70% RH. The reduction in output was measured during the running and the stain of the respective portions inside of the deck was evaluated after the running.

Electromagnetic characteristics:
7 MHz output:
  Using an 8-mm video deck ("FUJIX8" manufactured by Fuji Photo Film Co., Ltd.), a 7 MHz signal was recorded on the sample. The recorded 7 MHz signal was then reproduced from the sample and the reproduced output of the 7 MHz signal was measured by an oscilloscope. As a reference, an 8-mm tape SAG P6-120 manufactured by Fuji Photo Film Co., Ltd. was used.

Chroma output:
  Using an 8-mm video deck ("FUJIX8" manufactured by Fuji Photo Film Co., Ltd.), a 7 MHz carrier signal and 0.75 MHz signal were simultaneously recorded on the sample and the reproduced output when the 0.75 MHz signal was reproduced was measured by a spectrum analyzer.

RF output:
  A video signal of image signal 50IRE was recorded by a standard picture recording current. The mean value of the envelope of this reproduced RF output was measured with an oscilloscope and the RF output was calculated from the following equation.

$$RF\ output\ (dB) = 20\ \log 10/V0$$

wherein V represents the mean value and V0 represents a standard value. IRE means "The institute of Radio Engineers".

Pin holes:
  After applying the magnetic layer but before applying the back layer, the magnetic layer was irradiated with a transmitting white light. The number of pin holes was observed visually. Less than one pin hole per 100 m² was defined as preferable Stiffness:
  A loop test sample was formed from the sample to have a width of 8 mm and a length of 50 mm. Using a loop stiffness tester manufactured by Toyo Seiki Co., Ltd., the loop test sample was deformed inwardly in the radial direction by 5 mm at the rate of 3.5 mm/second to obtain the stiffness value in milligrams.

Metal components in ferromagnetic powder:
  5 grams of the ferromagnetic alloy powder was dissolved in 6N HCl and the metals in the solution were analyzed by an atomic absorption method to obtain the at % of the metals with respect to Fe.

The results of evaluating the 8-mm video tape samples of Examples 1 to 7 and Comparative Examples 1 and 2 by the above described methods are shown in Tables 1, 2 and 3.

In Tables 1 to 3, "*1" means the outputs and the maximum magnet fluxes measured after the samples were stored for one week at a temperature of 60° C. and a relative humidity of 90% and "*2" means the change in height of the head before and after P6-120 tape was run over 20 passes at a temperature of 5° C. and a relative humidity of 80% using a 8-mm video deck ("FUJIX8" manufactured by Fuji Photo Film Co., Ltd.). The initial height of the head was 20 μm.

TABLE 1

|  | Example 1 | Example 2 | Example 3 | Example 4 |
|---|---|---|---|---|
| Reproduced output (dB) |  |  |  |  |
| 7 MHz output | 7.1 | 7.4 | 6.5 | 6.2 |
| Chroma output | 1.2 | 1.3 | 2.4 | 1.8 |
| Output after storage(dB)(*1) |  |  |  |  |
| 7 MHz output | 6.2 | 6.5 | 5.9 | 5.6 |
| Chroma output | 0.7 | 0.8 | 1.9 | 1.4 |
| Demagnetization after storage (%) (*1) | −1.5 | −1.4 | −0.9 | −0.8 |
| Abrasion of head (μm) (*2) | 0.8 | 1.5 | 1.2 | 0.4 |

TABLE 2

|  | Example 5 | Example 6 | Example 7 |
|---|---|---|---|
| Reproduced output (dB) |  |  |  |
| 7 MHz output | 6.3 | 6.8 | 7.3 |
| Chroma output | 2.8 | 2.3 | 1.9 |
| Output after storage(dB)(*1) |  |  |  |
| 7 MHz output | 5.8 | 6.2 | 6.9 |
| Chroma output | 2.5 | 1.6 | 1.6 |
| Demagnetization after storage (%) (*1) | −0.4 | −1.3 | −1.6 |
| Abrasion of head (μm) (*2) | 0.7 | 1.1 | 0.5 |

TABLE 3

|  | Comparative Example 1 | Comparative Example 2 |
|---|---|---|
| Reproduced output (dB) | | |
| 7 MHz output | 3.6 | 7.0 |
| Chroma output | 0.3 | 2.6 |
| Output after storage(dB)(*1) | | |
| 7 MHz output | 3.2 | 2.1 |
| Chroma output | −0.2 | −0.5 |
| Demagnetization after storage (%) (*1) | −1.4 | −20.1 |
| Abrasion of head (μm) (*2) | 7.6 | 0.3 |

As apparent from a comparison of Examples 1 to 7 of Tables 1 and 2 with Comparative Examples 1 and 2 of Table 3, it was found that the present invention lowered the reduction in output and the demagnetization caused by storage under high-temperature and high-humidity conditions, also markedly decreased the abrasion of the head. It was also found that the weather resistance in Examples 1 to 7 was considerably improved as compared with Comparative Example 2 in which no rare earth element was contained.

EXAMPLE 8

An 8-mm video tape was prepared in the same manner as in Example 1 except that no non-magnetic layer was provided and that the coating solution for the magnetic layer was applied by means of a die coater having two slits so that the dry thickness of the magnetic layer was 2 μm.

EXAMPLE 9

An 8-mm video tape was prepared in the same manner as in Example 1 except that no non-magnetic layer was provided, that the coating solution was prepared using ferromagnetic alloy powder particles whose average length of the long axis was 0.18 μm, σs was 123 emu/g and crystallite size was 220 angstroms, and which contained Nd instead of Y in an amount of 1.5 at % based on Fe, and using carbon black having an average particle diameter of 65 mμ, and that the coating solution for the magnetic layer was applied by means of a die coater having two slits so that the dry thickness thereof was 2.5 μm.

COMPARATIVE EXAMPLE 3

An 8-mm video tape was prepared in the same manner as in Example 1 except that the coating solution was prepared using ferromagnetic alloy powder particles whose average length of the long axis was 0.25 μm, σs was 123 emu/g and crystallite size was 320 angstroms, and using carbon black having an average particle diameter of 80 mμ.

The thus obtained 8-mm video tape samples of Examples 8 and 9 and Comparative Example 3 were evaluated in the same manner as those of Examples 1 to 7 and Comparative Examples 1 and 2. The results of the evaluation are shown in Table 4.

In Table 4, "*1" means the outputs and the maximum magnet fluxes measured after the samples were stored for one week at a temperature of 60° C. and a relative humidity of 90% and "*2" means the change in height of the head before and after P6-120 tape was run over 20 passes at a temperature of 5° C. and a relative humidity of 80% using a 8-mm video deck ("FUJIX8" manufactured by Fuji Photo Film Co., Ltd.). The initial height of the head was 20 μm.

As apparent from Table 4, it was found that the 8-mm video tape samples of Examples 8 and 9 in which only a single magnetic layer were provided reproduced a considerably higher output both before and after being stored under high-temperature and high-humidity conditions than did that of Comparative Example 3 and that the amount of abrasion of the head was reduced as compared with Comparative Example 3.

TABLE 4

|  | Example 8 | Example 9 | Comparative Example 3 |
|---|---|---|---|
| Reproduced output (dB) | | | |
| 7 MHz output | 5.6 | 4.7 | 1.3 |
| Chroma output | 3.2 | 1.2 | 0.4 |
| Output after storage(dB)(*1) | | | |
| 7 MHz output | 5.3 | 4.4 | 1.1 |
| Chroma output | 2.9 | 0.7 | 0.1 |
| Demagnetization after storage (%) (*1) | −0.5 | −0.6 | −0.2 |
| Abrasion of head (μm) (*2) | 0.9 | 0.7 | 3.2 |

EXAMPLE 10

Components of a coating solution each having the composition set forth below were kneaded by a continuous kneader and were then dispersed by means of a sand mill. 3 parts of polyisocyanate were added to the resultant dispersion and 40 parts of butyl acetate were added to the mixture. Then, the resultant mixture was filtered by a filter having an average pore diameter of 1 μm, thereby preparing a coating solution for a first magnetic layer.

Ferromagnetic iron oxide powder 100 parts
(composition: $Fe_3O_4$ containing Co)

Hc: 850 Oe

Specific surface area by BET method: 40 m²/g

Crystallite size: 280 angstroms

Average length of the long axis: 0.25 μm

Acicular ratio: 8

σs: 72 emu/g

Water soluble Na: 10 ppm

Water soluble Ca: 10 ppm

Water soluble Fe: 0 ppm pH: 8.0

Other components were the same as those of the coating solution in Example 1.

Further, a coating solution for a second magnetic layer was prepared in the same manner as the coating solution for the first magnetic layer in Example 1.

The thus prepared coating solution for the first magnetic layer and coating solution for the second magnetic layer were simultaneously coated on a 7 μm thick polyethylene terephthalate support having a center-line average surface roughness of 0.01 μm by means of a die coater having two slits so that the second magnetic layer was formed on the first magnetic layer. The dry thickness of the first magnetic layer was 2.0 μm and the dry thickness of the second magnetic layer was 0.4 μm. While the two layers were still wet, the material was oriented under a cobalt magnet having a magnetic force of 3,000 Oe and a solenoid having a magnetic force of 1,500 Oe. After being dried, the material was calender-treated through a 7-stage calender made of only metal rollers at a temperature of 90° C. The material was then slit into 8-mm wide strips to prepare an 8-mm video tape.

COMPARATIVE EXAMPLE 4

The coating solution for a first magnetic layer was prepared in the same manner as in Example 10.

Further, the coating solution for the second magnetic layer was prepared in the same manner as in Example 10 except that a ferromagnetic powder particles whose σs was 128 emu/g and crystallite size was 180 angstroms, and which did not contain Y was used, and that α-alumina having an average particle diameter of 0.4 μm and carbon black having an average particle diameter of 16 mμ were used.

The thus prepared coating solution for the first magnetic layer and coating solution for the second magnetic layer were coated on a polyethylene terephthalate support in the same manner as in Example 10 to prepare an 8-mm video tape.

The thus obtained 8-mm video tape samples of Example 10 and Comparative Example 4 were evaluated in the same manner as those of Examples 1 to 7 and Comparative Examples 1 and 2. The results of the evaluation are shown in Table 5.

In Table 5, "*1 " means the outputs and the maximum magnet fluxes measured after the samples were stored for one week at a temperature of 60° C. and a relative humidity of 90% and "*2" means the change in height of the head before and after P6-120 tape was run over 20 passes at a temperature of 5° C. and a relative humidity of 80% using a 8-mm video deck ("FUJIX8" manufactured by Fuji Photo Film Co., Ltd.). The initial height of the head was 20 μm.

As apparent from Table 5, a comparison of the 8-mm video tape samples of Example 10 and Comparative Example 4 formed to have two magnetic layers showed that after storage under high-temperature and high-humidity conditions, the sample of Example 10 reproduced a higher output than did the sample of Comparative Example 4 which contained no earth rare metal element and in which the particle diameter of the abrasive was larger than 0.3 μm and the particle diameter of the carbon black was smaller than 50 mμ. Moreover, the abrasion of the head by the sample of Example 10 was lower than that by the sample of Comparative Example 4.

TABLE 5

|  | Example 10 | Comparative Example 4 |
|---|---|---|
| Reproduced output (dB) |  |  |
| 7 MHz output | 4.9 | 4.2 |
| Chroma output | 2.7 | 2.4 |
| Output after storage(dB)(*1) |  |  |
| 7 MHz output | 4.3 | 0.3 |
| Chroma output | 2.5 | 1.2 |

TABLE 5-continued

|  | Example 10 | Comparative Example 4 |
|---|---|---|
| Demagnetization after storage (%) (*1) | −0.1 | −6.0 |
| Abrasion of head (μm) (*2) | 0.6 | 5.7 |

EXAMPLE 11

An 8-mm video tape was prepared in the same manner as in Example 1 except that the ferromagnetic alloy powder particles whose σs was 155 emu/g and crystallite size was 190 angstroms was used.

COMPARATIVE EXAMPLE 5

It was tried to prepare an 8-mm video tape in the same manner as in Example 1 except that the ferromagnetic alloy powder particles had σs of 163 emu/g and a crystallite size of 195 angstroms.

The thus obtained 8-mm video tape samples of Example 11 and Comparative Example 5 were evaluated in the same manner as in Examples 1 to 7 and Comparative Examples 1 and 2. The results of the evaluation are shown in Table 6.

In Table 6, "*1" means the outputs and the maximum magnet fluxes measured after the samples were stored for one week at a temperature of 60° C. and a relative humidity of 90% and "*2" means the change in height of the head before and after P6-120 tape was run over 20 passes at a temperature of 5° C. and a relative humidity of 80% using a 8-mm video deck ("FUJIX8" manufactured by Fuji Photo Film Co., Ltd.). The initial height of the head was 20 μm.

As apparent from Table 6, it was found that the 8-mm video tape sample of Example 11 according to the present invention reproduced a considerably high output before and after storage under high-temperature and high humidity conditions and that the abrasion of the head was small, while the sample of Comparative Example 5 could not be formed with a magnetic layer due to the poor dispersibility of the coating solution for the magnetic layer.

TABLE 6

|  | Example 11 | Comparative Example 5 |
|---|---|---|
| Reproduced output (dB) |  |  |
| 7 MHz output | 7.8 | — |
| Chroma output | 3.7 | — |
| Output after storage(dB)(*1) |  |  |
| 7 MHz output | 7.0 | — |
| Chroma output | 2.9 | 1.2 |
| Demagnetization after storage (%) (*1) | −2.0 | — |
| Abrasion of head (μm) (*2) | 0.8 | — |

EXAMPLE 12

An 8-mm video tape was prepared in the same manner as in Example 1 except that the ferromagnetic alloy powder particles used had an average length of the long axis of 0.05 µm, a σs of 125 emu/g and a crystallite size of 100 angstroms. The thus obtained 8-mm video tape sample was evaluated in the same manner as in Examples 1 to 7 and Comparative Examples 1 and 2. The results of the evaluation are shown in Table 7.

In Table 7, "*1" means the outputs and the maximum magnet fluxes measured after the samples were stored for one week at a temperature of 60° C. and a relative humidity of 90% and "*2" means the change in height of the head before and after P6-120 tape was run over 20 passes at a temperature of 5° C. and a relative humidity of 80% using a 8-mm video deck ("FUJIX8" manufactured by Fuji Photo Film Co., Ltd.). The initial height of the head was 20 µm.

As shown in Table 7, it was found that the 8-mm video tape sample of Example 12 according to the present invention reproduced a considerably high output before and after storage under high-temperature and high-humidity conditions and that the abrasion of the head was small.

On the other hand, when the ferromagnetic alloy powder particles was used whose average length of the long axis was equal to or smaller than 0.04 µm and crystallite size was equal to or smaller than 100 angstroms, ferromagnetic alloy powder could not be prepared because the coercive force was insufficient.

EXAMPLE 13

An 8-mm video tape was prepared in the same manner as in Example 1 except that α-alumina having an average particle diameter of 0.06 µm was used.

COMPARATIVE EXAMPLE 6

An 8-mm video tape was prepared in the same manner as in Example 1 except that α-alumina having an average particle diameter of 0.02 µm was used.

The thus obtained 8-mm video tape samples were evaluated in the same manner as in Examples 1 to 7 and Comparative Examples 1 and 2. The results of the evaluation are shown in Table 7.

In Table 7, "*1 " means the outputs and the maximum magnet fluxes measured after the samples were stored for one week at a temperature of 60° C. and a relative humidity of 90% and "*2" means the change in height of the head before and after P6-120 tape was run over 20 passes at a temperature of 5° C. and a relative humidity of 80% using a 8-mm video deck ("FUJIX8" manufactured by Fuji Photo Film Co., Ltd.). The initial height of the head was 20 µm.

TABLE 7

|  | Example 12 | Example 13 | Comparative Example 6 |
| --- | --- | --- | --- |
| Reproduced output (dB) |  |  |  |
| 7 MHz output | 7.6 | 6.9 | N/A |
| Chroma output | 1.1 | 1.3 | N/A |
| Output after storage(dB)(*1) |  |  |  |
| 7 MHz output | 6.4 | 6.3 | N/A |
| Chroma output | 0.9 | 0.8 | N/A |
| Demagnetization after storage (%) (*1) | −1.8 | −1.1 | N/A |
| Abrasion of head (µm) (*2) | 0.3 | 0.1 | N/A |

"N/A" means "non-applicable."

COMPARATIVE EXAMPLE 7

An 8-mm video tape was prepared in the same manner as in Example 1 except that the carbon black had an average diameter of 350 mµ.

COMPARATIVE EXAMPLE 8

An 8-mm video tape was prepared in the same manner as in Example 1 except that the carbon black was not added.

COMPARATIVE EXAMPLE 9

An 8-mm video tape was prepared in the same manner as in Example 1 except that the carbon black had an average diameter of 35 mµ.

The thus obtained 8-mm video tape samples of Comparative Examples 7 to 9 were evaluated in the same manner as in Examples 1 to 7 and Comparative Examples 1 and 2. The results of the evaluation are shown in Table 8.

In Table 8, "*1" means the outputs and the maximum magnet fluxes measured after the samples were stored for one week at a temperature of 60° C. and a relative humidity of 90% and "*2" means the change in height of the head before and after P6-120 tape was run over 20 passes at a temperature of 5° C. and a relative humidity of 80% using a 8-mm video deck ("FUJIX8" manufactured by Fuji Photo Film Co., Ltd.). The initial height of the head was 20 µm.

TABLE 8

|  | Comparative Example 7 | Comparative Example 8 | Comparative Example 9 |
| --- | --- | --- | --- |
| Reproduced output (dB) |  |  |  |
| 7 MHz output | 1.2 | 6.2 | 6.0 |
| Chroma output | 0.5 | 1.6 | 1.5 |
| Output after storage(dB)(*1) |  |  |  |
| 7 MHz output | 0.9 | 4.9 | 5.2 |
| Chroma output | 0.4 | 0.9 | 1.0 |
| Demagnetization after storage (%) (*1) | −1.0 | −1.3 | −1.4 |
| Abrasion of head (µm) (*2) | 0.1 | 6.7 | 4.8 |

Comparing Table 8 with Table 1, it was found that the 8-mm video tape sample of Example 1 according to the present invention reproduced a considerably high output before and after storage under high-temperature and high-humidity conditions and that the abrasion of the head was reduced as compared with the 8-mm video tape sample of Comparative Example 7 containing carbon black having an average particle diameter larger than 300 mµ. Further, it was also found that the abrasion of the head was markedly decreased in Example 1 as compared with the 8-mm video tape sample of Comparative Example 8 containing no carbon black and the 8-mm video tape sample of Comparative Example 9 containing carbon black having an average particle diameter smaller than 50 mμ.

As described above, it was found that the present invention provided a magnetic recording medium which exhibited remarkably high outputs at 7 MHz and 0.7 MHz and a low loss of magnetization after storage and was able to inhibit abrasion of the head with which it was used.

According to the present invention, it is possible to provide a magnetic recording medium which comprises at least one magnetic layer formed by dispersing a ferromagnetic powder in a binder, has an excellent electromagnetic conversion characteristics and, particularly, a good preservation capability and can prevent a magnetic head from being abraded by causing the ferromagnetic powder to contain at least one kind of rare earth metal element selected from Y or metal elements of lanthanide series and to be constituted of acicular ferromagnetic alloy powder particles whose σs is in the range of 120 to 160 emu/g, whose average longitudinal axis length is in the range of 0.04 to 0.2 μm and whose crystallite size is in the range of 100 to 300 angstroms, said magnetic layer including an abrasive agent whose average particle diameter is in the range of 0.03 to 0.3 μm.

We claims:

1. A magnetic recording medium which comprises a support and at least one magnetic layer containing a ferromagnetic powder and a binder on said support, said ferromagnetic powder comprising at least one rare earth metal element selected from the group consisting of Y and metal elements of lanthanide series, and said ferromagnetic powder being acicular ferromagnetic alloy powder particles having σs in the range of 120 to 160 emu/g, an average longitudinal axis length in the range of 0.04 to 0.2 μm and crystallite size is in the range of 100 to 300 angstroms, said magnetic layer including an abrasive agent having an average particle diameter in the range of 0.03 to 0.3 μm and containing carbon black having an average particle diameter of 50 to 300 mμ, wherein said ferromagnetic powder contains Co and Al, said Al being present in said ferromagnetic powder in an amount of 2 to 15 at % with respect to Fe present in said ferromagnetic powder.

2. A magnetic recording medium in accordance with claim 1, further comprising a non-magnetic layer between said support and said magnetic layers and said non-magnetic layer containing a non-magnetic powder in a binder.

3. A magnetic recording medium in accordance with claim 2, wherein said metal elements of lanthanide series include Nd, Sm, Dy, Gd, Tb and La.

4. A magnetic recording medium in accordance with claim 2, wherein said magnetic layer has a thickness in the range of 0.1 to 0.8 μm.

5. A magnetic recording medium in accordance with claim 3, wherein said magnetic layer has a thickness in the range of 0.1 to 4 μm.

6. A magnetic recording medium in accordance with claim 2, wherein said non-magnetic powder is selected from the group consisting of titanium oxide, barium sulfate, silica, α-alumina, zinc oxide, α-iron oxide, cerium oxide, tin oxide and zirconia.

7. A magnetic recording medium in accordance with claim 3, wherein said non-magnetic powder is selected from the group consisting of titanium oxide, barium sulfate, silica, α-alumina, zinc oxide, α-iron oxide, cerium oxide, tin oxide and zirconia.

8. A magnetic recording medium in accordance with claim 4, wherein said non-magnetic powder is selected from the group consisting of titanium oxide, barium sulfate, silica, α-alumina, zinc oxide, α-iron oxide, cerium oxide, tin oxide and zirconia.

9. A magnetic recording medium in accordance with claim 5, wherein said non-magnetic powder is selected from the group consisting of titanium oxide, barium sulfate, silica, α-alumina, zinc oxide, α-iron oxide, cerium oxide, tin oxide and zirconia.

10. A magnetic recording medium in accordance with claim 9, wherein said magnetic layer is formed by being coated on said non-magnetic layer while said non-magnetic layer is still wet.

11. A magnetic recording medium in accordance with claim 2, wherein said magnetic layer is formed by being coated on said non-magnetic layer while said non-magnetic layer is still wet.

12. A magnetic recording medium in accordance with claim 3, wherein said magnetic layer is formed by being coated on said non-magnetic layer while said non-magnetic layer is still wet.

13. A magnetic recording medium in accordance with claim 4, wherein said magnetic layer is formed by being coated on said non-magnetic layer while said non-magnetic layer is still wet.

14. A magnetic recording medium in accordance with claim 5, wherein said magnetic layer is formed by being coated on said non-magnetic layer while said non-magnetic layer is still wet.

15. A magnetic recording medium in accordance with claim 6, wherein said magnetic layer is formed by being coated on said non-magnetic layer while said non-magnetic layer is still wet.

16. A magnetic recording medium in accordance with claim 1, wherein said carbon black has an average particle diameter of 70 to 280 mμ.

17. A magnetic recording medium in accordance with claim 1, wherein said carbon black has a specific surface area in a range of 5 to 500 m$^2$/g and DBP oil absorption thereof is in a range of 10 to 400 ml/100 g.

18. A magnetic recording medium in accordance with claim 17, wherein said carbon black has a pH value in a range of 2 to 10, a water content in a range of 0.1 to 10% and a tap density in a range of 0.1 to 1 g/cc.

19. A magnetic recording medium in accordance with claim 1, wherein said carbon black is present in said magnetic layer in a amount of 0.1 to 30% by weight of said ferromagnetic powder.

* * * * *